(12) United States Patent
Higuchi et al.

(10) Patent No.: US 7,967,579 B2
(45) Date of Patent: Jun. 28, 2011

(54) HERMETIC COMPRESSOR WITH SPOT JOINING PORTIONS FIXING A MOTOR STATOR TO A CYLINDRICAL PORTION OF A CASING WHERE A CLEARANCE IS SECURED THEREBETWEEN

(75) Inventors: Masahide Higuchi, Kusatsu (JP); Masanori Masuda, Sakai (JP); Toshiaki Yoshii, Kusatsu (JP); Kazuhiro Furusho, Sakai (JP); Satoshi Ishikawa, Maebaru (JP)

(73) Assignee: Daikin Industries, Ltd., Osaka (JP)

( * ) Notice: Subject to any disclaimer, the term of this patent is extended or adjusted under 35 U.S.C. 154(b) by 237 days.

(21) Appl. No.: 12/376,814

(22) PCT Filed: Aug. 8, 2007

(86) PCT No.: PCT/JP2007/065513
§ 371 (c)(1),
(2), (4) Date: Feb. 9, 2009

(87) PCT Pub. No.: WO2008/018499
PCT Pub. Date: Feb. 14, 2008

(65) Prior Publication Data
US 2010/0166577 A1  Jul. 1, 2010

(30) Foreign Application Priority Data
Aug. 11, 2006 (JP) .................. 2006-219597

(51) Int. Cl.
F04B 35/04 (2006.01)
H02K 5/00 (2006.01)
H02K 1/06 (2006.01)
(52) U.S. Cl. .................. 417/410.3; 310/89; 310/216.136
(58) Field of Classification Search .................. 417/312, 417/410.1, 410.3; 310/89, 216.136, 216.049
See application file for complete search history.

(56) References Cited

U.S. PATENT DOCUMENTS 2,593,857 A * 4/1952 De Windt et al. ...... 310/216.136
2002/0051715 A1   5/2002 Matsumoto et al.

FOREIGN PATENT DOCUMENTS

| JP | S52-094105 U | 7/1977 |
| JP | S58-075431 A | 5/1983 |
| JP | H02-011875 A | 1/1990 |
| JP | H10-238465 A | 9/1998 |
| JP | 2001-227468 A | 8/2001 |
| JP | 2001-342954 A | 12/2001 |
| JP | 2003-088013 A | 3/2003 |
| JP | 2004-201428 A | 7/2004 |

* cited by examiner

*Primary Examiner* — Charles G Freay
(74) *Attorney, Agent, or Firm* — Global IP Counselors (57) ABSTRACT

A hermetic compressor is disposed with an annular motor stator, a motor rotor, a casing and plural spot joining portions. The motor rotor is disposed such that it may freely rotate in a space inside the motor stator. The casing includes a cylindrical portion. The cylindrical portion houses the motor stator and the motor rotor. The plural spot joining portions fix the motor stator to the cylindrical portion by spot joining in a state where a clearance is secured between the motor stator and the cylindrical portion.

8 Claims, 5 Drawing Sheets

HERMETIC COMPRESSOR WITH SPOT JOINING PORTIONS FIXING A MOTOR STATOR TO A CYLINDRICAL PORTION OF A CASING WHERE A CLEARANCE IS SECURED THEREBETWEEN

CROSS-REFERENCE TO RELATED APPLICATIONS

This U.S. National stage application claims priority under 35 U.S.C. §119(a) to Japanese Patent Application No. 2006-219597, filed in Japan on Aug. 11, 2006, the entire contents of which are hereby incorporated herein by reference.

TECHNICAL FIELD

The present invention relates to a hermetic compressor where a motor stator is fixed inside a casing.

BACKGROUND ART

Conventionally, in hermetic compressors, a structure where a motor stator is fixed to an inner peripheral surface of a casing has been employed. For example, in the concentrated winding motor described in JP-A No. 2004-201428, the motor stator is fixed inside the casing by shrink fitting or press fitting.

SUMMARY OF THE INVENTION

Problem to be Solved by the Invention

However, when magnetic flux concentrates in and flows through teeth of the concentrated winding motor described in JP-A No. 2004-201428, there is a tendency for circumferential direction force (radial force) that tries to deform the motor stator to become larger. Further, in a motor that is driven by a square-wave voltage or a square-wave current, magnetic flux concentrates in the teeth, whereby the circumferential direction force becomes unbalanced and vibration and noise of the motor increase. Thus, vibration and noise of the casing, which tightly contacts the motor stator, increase.

Further, in the case of the concentrated winding motor described in JP-A No. 2004-201428, the motor stator is fixed to the casing by shrink fitting or press fitting, so there is the problem that stress acts on the yoke of the motor and iron loss increases.

Moreover, in the case of a hermetic compressor that uses $CO_2$ refrigerant, the pressure inside the casing is high, so it is difficult to fix the motor stator inside the casing by shrink fitting or press fitting.

It is an object of the present invention to provide a hermetic compressor that can suppress vibration of a casing.

Means for Solving the Problem

A hermetic compressor of a first aspect comprises an annular motor stator, a motor rotor, a casing and plural spot joining portions. The motor rotor is disposed such that it may freely rotate in a space inside the motor stator. The casing includes a cylindrical portion. The cylindrical portion houses the motor stator and the motor rotor. The plural spot joining portions fix the motor stator to the cylindrical portion by spot joining in a state where a clearance is secured between the motor stator and the cylindrical portion.

Here, the plural spot joining portions fix the motor stator to the cylindrical portion by spot joining in a state where a clearance is secured between the motor stator and the cylindrical portion, so it is possible to suppress vibration and noise of the cylindrical portion of the casing.

A hermetic compressor of a second aspect comprises the hermetic compressor of the first aspect, wherein a size of the clearance is 10 to 300 μm.

Here, the size of the clearance is set to be equal to or greater than about 10 μm in radius, so it is possible to more effectively suppress vibration of the cylindrical portion. Further, the upper limit of the clearance is set to be equal to or less than about 300 μm in radius, so when the spot joining is performed by spot welding, it is possible to prevent sputter that is generated from mixing in the inside of the compressor. Further, when joining by convex portions, it is possible to satisfy the necessary joining strength.

A hermetic compressor of a third aspect comprises the hermetic compressor of the first aspect or the second aspect, wherein the spot joining portions are disposed in three or more spots in a circumferential direction on an outer peripheral surface of the motor stator.

Here, the spot joining portions are disposed in three or more spots in a circumferential direction on an outer peripheral surface of the motor stator, so it is possible to more effectively suppress vibration of the cylindrical portion of the casing while fixing the motor stator in a stable state.

A hermetic compressor of a fourth aspect comprises the hermetic compressor of any of the first aspect to the third aspect, wherein the spot joining portions are disposed in plural places in an axial direction of the motor rotor on an outer peripheral surface of the motor stator.

Here, the spot joining portions are disposed in plural places in an axial direction of the motor rotor on an outer peripheral surface of the motor stator, so it is possible to more effectively suppress vibration of the cylindrical portion of the casing while fixing the motor stator in a stable state.

A hermetic compressor of a fifth aspect comprises the hermetic compressor of any of the first aspect to the fourth aspect, wherein the spot joining portions are formed by spot welding.

Here, the spot joining portions are formed by spot welding, so the motor stator can be simply and reliably fixed inside the cylindrical portion of the casing, and it is possible to more effectively suppress vibration of the cylindrical portion of the casing.

A hermetic compressor of a sixth aspect comprises the hermetic compressor of any of the first aspect to the fourth aspect, wherein the spot joining portions are convex portions that are formed on either the motor stator or the cylindrical portion.

Here, the spot joining portions are convex portions that are formed on either the motor stator or the cylindrical portion, so it becomes difficult for vibration of the motor stator to spread to the casing, and it is possible to suppress vibration of the cylindrical portion of the casing.

It will be noted that the convex portions of the cylindrical portion referred to here are projections where the cylindrical portion is deformed from outside to inside, claws that are disposed by cutting the inner surface of the cylindrical portion, or projections that are disposed as separate parts inside the cylindrical portion. Further, the convex portions of the motor stator are projections that are disposed by partially enlarging the outer diameter of a laminate steel plate or as separate parts on the outer peripheral portion of the motor stator, or are parts which have convex portions toward the cylindrical portion and the motor stator or whose contact portions are limited. Further, the convex portions of the motor stator may also be portions whose surfaces are uneven in the range of the clearance of 10 to 300 μm or with which the convex portions in the cylindrical portion (seen from the inside of the casing) are caulked.

A hermetic compressor of a seventh aspect comprises the hermetic compressor of any of the first aspect to the fourth aspect, wherein the spot joining portions include a spacer that is interposed between the motor stator and the cylindrical portion and laser-welded portions where the spacer has been respectively laser-welded to the motor stator and the cylindrical portion.

Here, the spot joining portions include the spacer and the laser-welded portions, so it becomes difficult for vibration of the motor stator to spread to the casing, and it is possible to suppress vibration of the cylindrical portion of the casing.

A hermetic compressor of an eighth aspect comprises an annular motor stator, a motor rotor that is disposed such that it may freely rotate in a space inside the motor stator, a casing that includes a cylindrical portion that houses the motor stator and the motor rotor, and joining portions that join the motor stator to the cylindrical portion. The proportion of the sum of the perimeters of the joining portions on a cross section that is orthogonal to a central axis of the cylindrical portion and includes the joining portions to the perimeter of an inner peripheral surface of the cylindrical portion is less than 10% with respect to a portion where an outer peripheral surface of the motor stator and the inner peripheral surface of the cylindrical portion face each other, and a clearance is secured at other portions except the joining portions.

Here, the proportion of the sum of the perimeters of the joining portions on a cross section that is orthogonal to the central axis of the cylindrical portion and includes the joining portions to the perimeter of the inner peripheral surface of the cylindrical portion is less than 10% with respect to the portion where the outer peripheral surface of the motor stator and the inner peripheral surface of the cylindrical portion face each other, and a clearance is secured at other portions except the joining portions. For that reason, it becomes difficult for vibration of the motor stator to spread to the casing, so it is possible to suppress vibration of the cylindrical portion of the casing.

A hermetic compressor of a ninth aspect comprises the hermetic compressor of any of the first aspect to the eighth aspect, wherein the motor stator is held between and by configural parts that are respectively positioned above and below the motor stator.

Here, the motor stator is sandwiched between and held by configural parts that are respectively positioned above and below the motor stator, so it becomes difficult for vibration of the motor stator to spread to the casing, and it is possible to suppress vibration of the cylindrical portion of the casing.

A hermetic compressor of a tenth aspect comprises the hermetic compressor of the fifth aspect, wherein welding holes are disposed in the cylindrical portion with respect to the motor stator. The motor stator is welded to the cylindrical portion via the welding holes.

Here, welding holes are disposed in the cylindrical portion, so it is possible to fix the motor stator by welding the motor stator to the cylindrical portion via the welding holes.

A hermetic compressor of an eleventh aspect comprises the hermetic compressor of the first aspect to the fourth aspect, wherein the spot joining portions are members that are fitted between the motor stator and the cylindrical portion.

Here, members that are fitted between the motor stator and the cylindrical portion are used as the spot joining portions, whereby the motor stator and the cylindrical portion are fixed each other by spot joining in a state where a clearance is secured between the motor stator and the cylindrical portion, so it is possible to suppress vibration and noise of the cylindrical portion of the casing.

EFFECTS OF THE INVENTION

According to the first aspect, it is possible to suppress vibration and noise of the cylindrical portion of the casing.

According to the second aspect, it is possible to more effectively suppress vibration of the cylindrical portion.

According to the third aspect, it is possible to more effectively suppress vibration of the cylindrical portion of the casing while fixing the motor stator in a stable state.

According to the fourth aspect, it is possible to more effectively suppress vibration of the cylindrical portion of the casing while fixing the motor stator in a stable state.

According to the fifth aspect, the motor stator can be simply and reliably fixed inside the cylindrical portion of the casing, and it is possible to more effectively suppress vibration of the cylindrical portion of the casing.

According to the sixth aspect, it is possible to suppress vibration of the cylindrical portion of the casing.

According to the seventh aspect, it is possible to suppress vibration of the cylindrical portion of the casing.

According to the eighth aspect, it is possible to suppress vibration of the cylindrical portion of the casing.

According to the ninth aspect, it is possible to suppress vibration of the cylindrical portion of the casing.

According to the tenth aspect, the motor stator can be fixed by welding the motor stator to the cylindrical portion via the welding holes.

According to the eleventh aspect, members that are fitted between the motor stator and the cylindrical portion are used, whereby vibration of the cylindrical portion of the casing can be controlled.

DETAILED DESCRIPTION OF THE INVENTION

Figure 1:
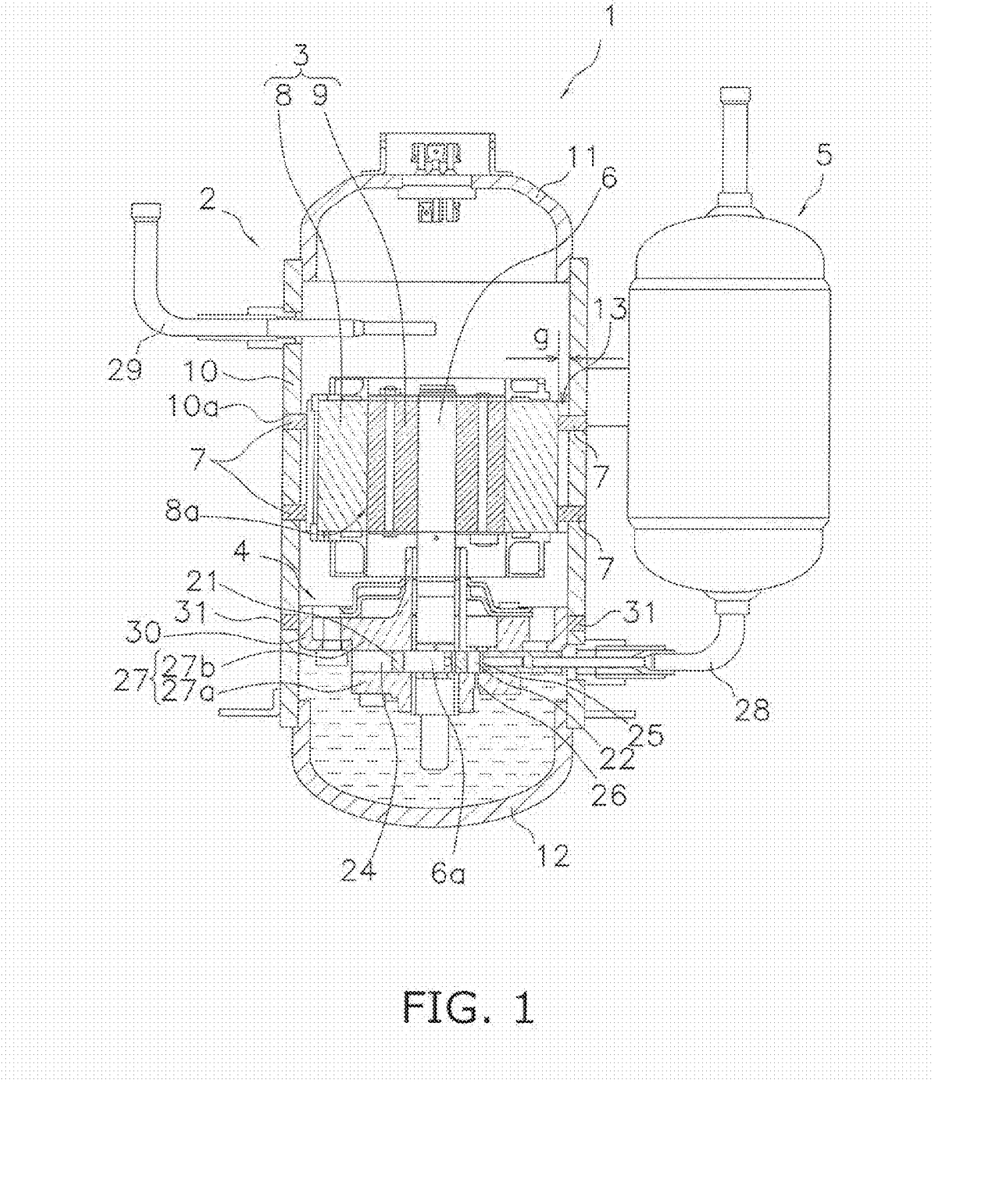
FIG. 1 is a longitudinal sectional diagram of a hermetic compressor pertaining to an embodiment of the present invention.

A hermetic compressor 1 that uses $CO_2$ refrigerant and is shown in FIG. 1 is disposed with a casing 2, a motor 3, a compression mechanism 4, an accumulator 5, a shall 6 and plural spot joining portions 7. The motor 3, the compression mechanism 4 and the shaft 6 are housed inside the casing 2.

The motor 3 includes an annular motor stator 8 and a motor rotor 9 that is disposed such that it may freely rotate in a space 8a inside the motor stator 8. The motor rotor 9 is coupled to the shaft 6 and is capable of rotating together with the shaft 6.

The casing 2 includes a cylindrical portion 10 and a pair of end plates 11 and 12 that close upper and lower open ends of the cylindrical portion 10. The cylindrical portion 10 of the casing 2 houses the motor stator 8 and the motor rotor 9 of the motor 3. The internal pressure of the casing 2 that is filled with the $CO_2$ refrigerant is a high pressure (about 14 MPa).

The plural spot joining portions 7 fix the motor stator 8 to the cylindrical portion 10 by spot joining resulting from spot welding in a state where a clearance 13 is secured between the motor stator 8 and the cylindrical portion 10. Thus, it becomes difficult for vibration of the motor stator 8 to spread to the casing 2, so it is possible to suppress vibration of the cylindrical portion 10 of the casing 2. This is because the cross-sectional areas of portions where vibration spreads from the motor stator 8 to the cylindrical portion 10 (the cross-sectional areas of the plural spot joining portions 7) are narrow.

That is, in the present embodiment, the proportion of the sum of the perimeters of the joining portions 7 on a cross section that is orthogonal to a central axis of the cylindrical portion 10 and includes the joining portions 7 to the perimeter of an inner peripheral surface of the cylindrical portion 10 is less than 10% with respect to a portion where an outer peripheral surface of the motor stator 8 and the inner peripheral surface of the cylindrical portion 10 face each other, and the clearance 13 is secured at other portions except the spot joining portions 7. For that reason, it becomes difficult for vibration of the motor stator 8 to spread to the casing 2, so it is possible to suppress vibration of the cylindrical portion 10 of the casing 2.

Here, in a case where the proportion of the sum of the perimeters of the joining portions 7 on a cross section (that is, on a transverse section (on a circular section) of the cylindrical portion 10) that is orthogonal to the central axis of the cylindrical portion 10 and includes the joining portions 7 to the perimeter of the inner peripheral surface of the cylindrical portion 10 is less than 10%, it is difficult to fix the motor stator 8 inside the cylindrical portion 10 with a fixing method employing conventional shrink fitting or press fitting because the joining area is too small. Moreover, the internal pressure of the casing 2 that is filled with the $CO_2$ refrigerant is a high pressure, so fixing by employing conventional shrink fitting press or fitting is even more difficult in consideration of expansion of the casing 2 resulting from the internal pressure.

Figure 2:
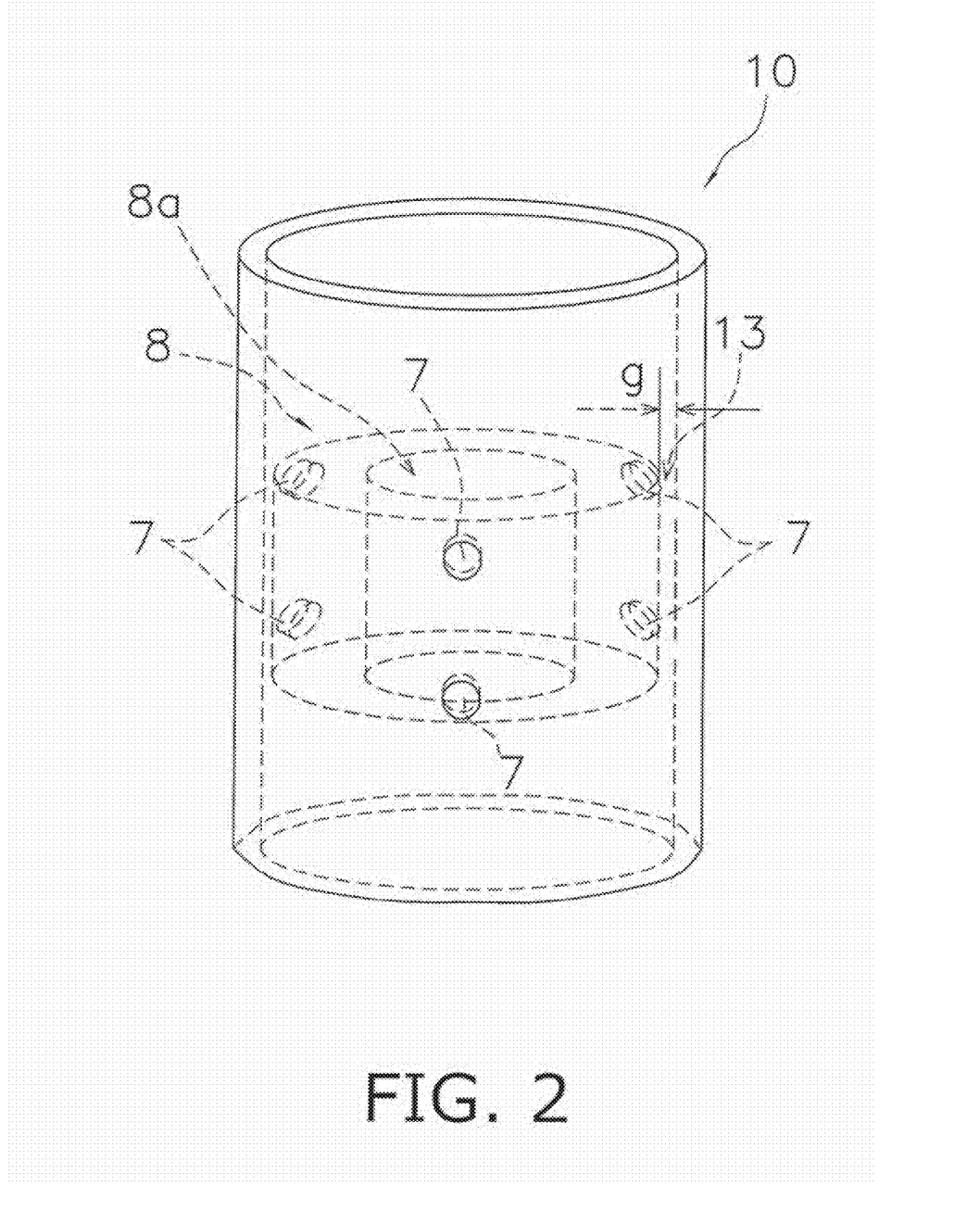
FIG. 2 is a perspective diagram generally showing the arrangement of a cylindrical portion of a casing, a motor stator and spot joining portions of FIG. 1.

As shown in FIG. 2, the motor stator 8 is fixed inside the cylindrical portion 10 by spot welding at three or more of the spot joining portions 7 in regard to one transverse section and at two or more transverse sections.

The number of the spot joining portions 7 may be appropriately set in correspondence to the radii and lengths of the cylindrical portion 10 and the motor stator 8.

A size g of the clearance 13 is set to about 10 to 300 μm, so it is possible to more effectively suppress vibration of the cylindrical portion 10.

Figure 3:
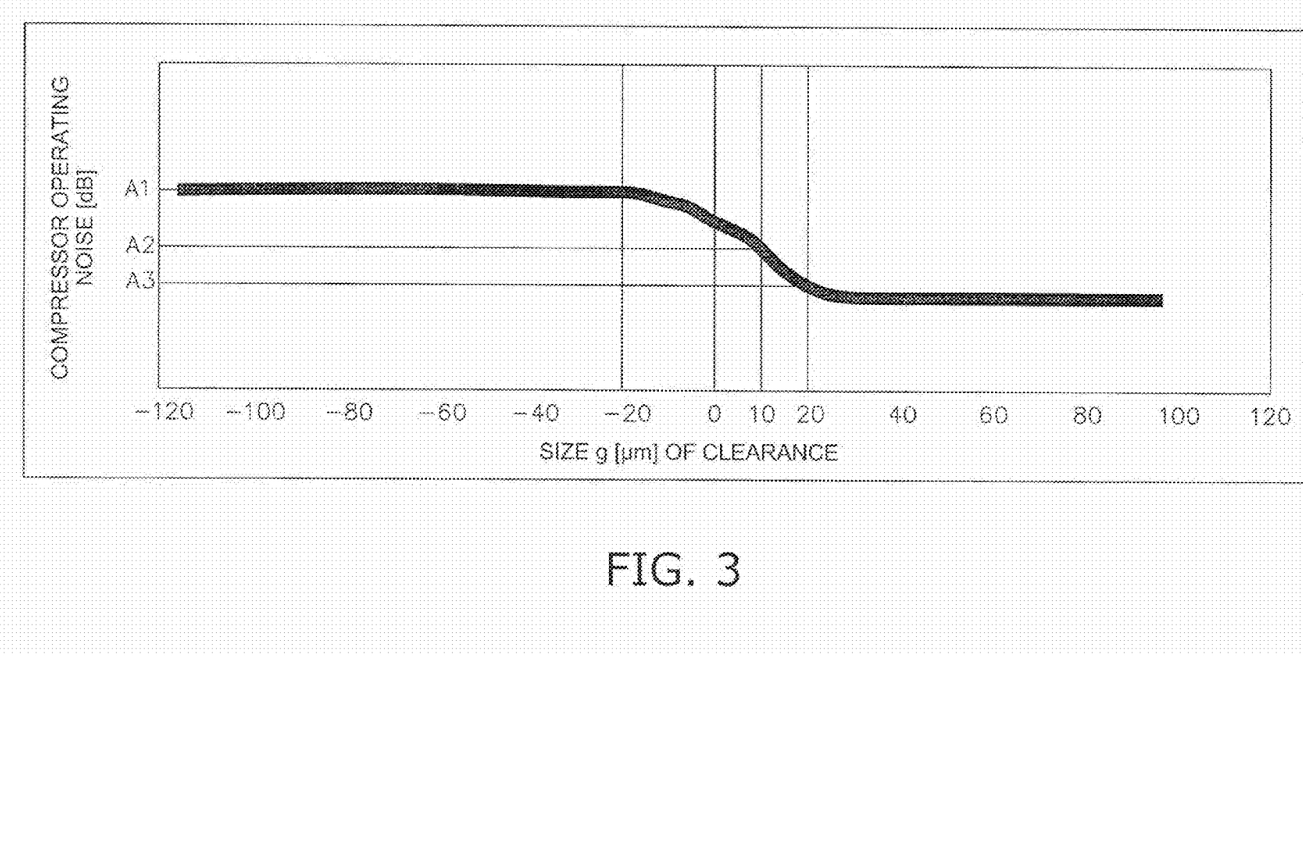
FIG. 3 is a graph showing the relationship between the size of a clearance between the cylindrical portion and the motor stator of FIG. 1 and the magnitude of compressor operating noise.

Here, as shown in FIG. 3, when the relationship between the size g (microns) of the clearance 13 and compressor operating noise (decibels) A was generally investigated, it was understood that, with respect to compressor operating noise A1 in a case where the size g of the clearance 13 is equal to or less than −20 microns (that is, a tight fit state), compressor operating noise A2 in a case where the size g of the clearance 13 is 10 microns reduces to almost 90% of A1 and compressor operating noise A3 in a case where the size g of the clearance 13 is equal to or greater than 20 microns reduces to almost 80% of A1.

The spot joining portions 7 are disposed in three or more spots in a circumferential direction on the outer peripheral surface of the motor stator 8, so it is possible to more effectively suppress vibration of the cylindrical portion 10 of the casing 2 while fixing the motor stator 8 in a stable state.

The spot joining portions 7 are disposed in plural places in an axial direction of the motor rotor 9 on the outer peripheral surface of the motor stator 8, so it is possible to more effectively suppress vibration of the cylindrical portion 10 of the casing 2 while fixing the motor stator 8 in a stable state.

The spot joining portions 7 are formed by spot welding, so the motor stator 8 can be simply and reliably fixed inside the cylindrical portion 10 of the casing 2, and it is possible to more effectively suppress vibration of the cylindrical portion 10 of the casing 2.

The spot joining portions 7 are specifically formed by forming through holes 10a as welding holes in the cylindrical portion 10 and spot-welding the motor stator 8 through those through holes 10a.

Figure 4:
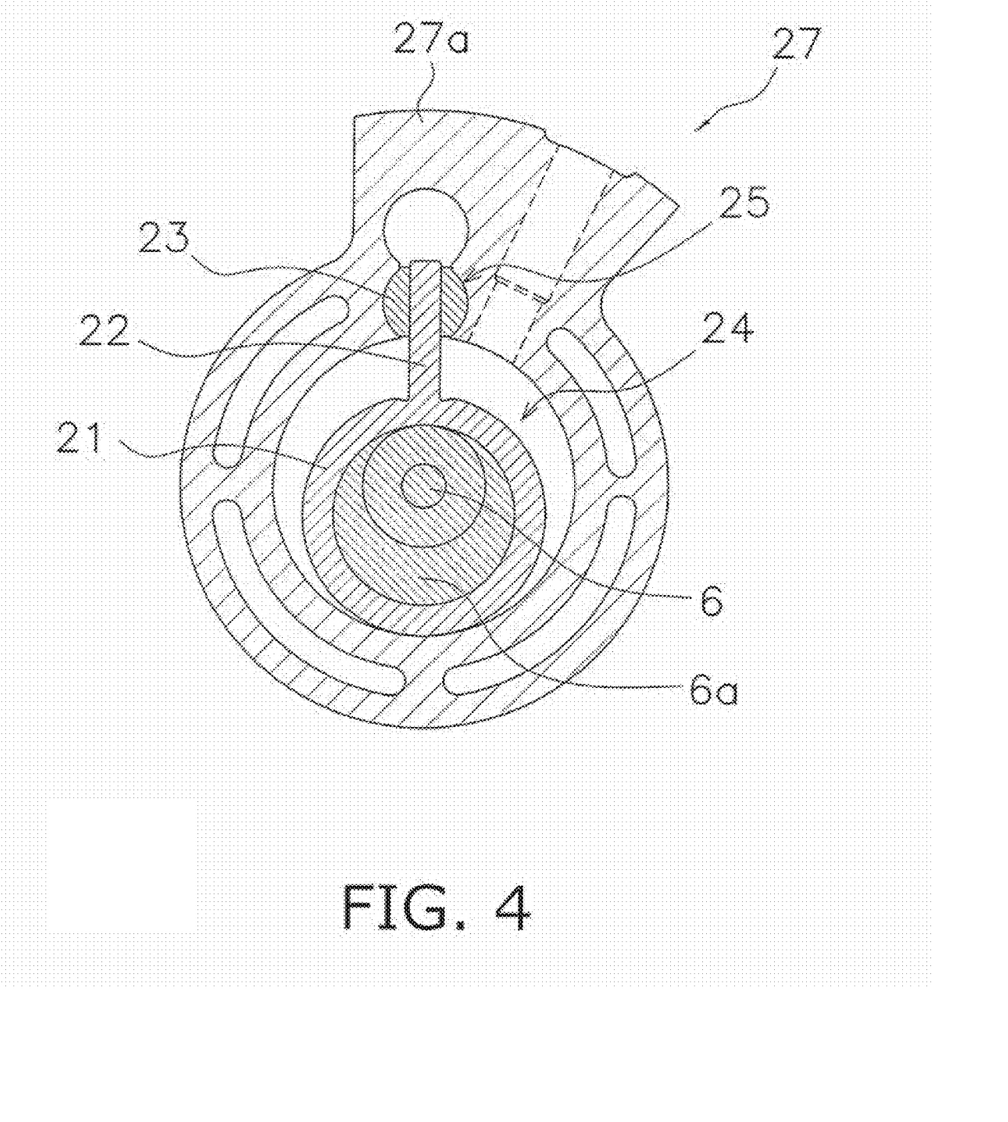
FIG. 4 is a horizontal sectional diagram of a compression mechanism of FIG. 1.

The compression mechanism 4 includes, as shown in FIG. 1 and FIG. 4, an oscillating piston 21 that includes a blade 22, a bush 23 that supports the blade 22 such that the blade 22 is capable of oscillating, and a cylinder 27. The cylinder 27 includes a cylinder chamber 24 that houses the swinging piston 21, a bush hole 25 into which the bush 23 is inserted such that the bush 23 may freely rotate, and an oil supply communication hole 26 that is communicated with the bush hole 25.

The swinging piston 21 oscillates inside the cylinder chamber 24 as a result of an eccentric portion 6a of the shaft 6 receiving rotational driving force of the motor 3 and eccentrically rotating, whereby the $CO_2$ refrigerant that has been sucked in from a suction pipe 28 is compressed inside the cylinder chamber 24. The $CO_2$ refrigerant that has been compressed rises through the inside of the casing 2 and is discharged from a discharge pipe 29.

The cylinder 27 includes a lower block 27a and an upper block 27b. The cylinder 27 is screwed to a mounting plate 30. The mounting plate 30 is fixed to the cylindrical portion 10 of the casing 2 by mounting plate joining portions 31. The mounting plate joining portions 31 are formed by spot welding.

<Characteristics>

(1)

In the hermetic compressor 1 of the embodiment, the plural spot joining portions 7 fix the motor stator 8 to the cylindrical portion 10 by spot joining resulting from spot welding in a state where the clearance 13 is secured between the motor stator 8 and the cylindrical portion 10, so it is possible to suppress vibration of the cylindrical portion 10 of the casing 2 and noise resulting from that.

(2)

Further, the hermetic compressor 1 of the embodiment is a hermetic compressor that uses $CO_2$ refrigerant, and the internal pressure inside the casing 2 is high, so although it is difficult to fix the motor stator 8 by shrink fitting or press fitting, it is possible to fix the motor stator 8 to the cylindrical portion 10 by spot joining by the plural spot joining portions 7. Thus, it is possible to prevent dropping-out of the motor stator 8.

(3)

In the hermetic compressor 1 of the embodiment, the motor stator 8 can be fixed inside the cylindrical portion 10 of the casing 2 by the plural spot joining portions 7 such that large stress does not act from the cylindrical portion 10, so it is possible to reduce iron loss.

(4)

In the hermetic compressor 1 of the embodiment, the plural spot joining portions 7 fix the motor stator 8 to the cylindrical portion 10 by spot joining resulting from spot welding in a state where the clearance 13 is secured between the motor stator 8 and the cylindrical portion 10, so a two-ply casing structure or special motor fixing member for preventing vibration of the casing becomes unnecessary, and it is possible to significantly reduce the manufacturing cost of the hermetic compressor 1.

(5)

In the hermetic compressor 1 of the embodiment, the size g of the clearance 13 is set to about 10 to 300 μm, so it is possible to more effectively suppress vibration of the cylindrical portion 10.

(6)

In the hermetic compressor 1 of the embodiment, the spot joining portions 7 are disposed in three or more spots in the circumferential direction on the outer peripheral surface of the motor stator 8, so it is possible to more effectively suppress vibration of the cylindrical portion 10 of the casing 2 while fixing the motor stator 8 in a stable state.

(7)

In the hermetic compressor 1 of the embodiment, the spot joining portions 7 are disposed in plural places in the axial direction of the motor rotor 9 on the outer peripheral surface of the motor stator 8, so it is possible to more effectively suppress vibration of the cylindrical portion 10 of the casing 2 while fixing the motor stator 8 in a stable state.

(8)

In the hermetic compressor 1 of the embodiment, the spot joining portions 7 are formed by spot welding, so the motor stator 8 can be simply and reliably fixed inside the cylindrical portion 10 of the casing 2, and it is possible to more effectively suppress vibration of the cylindrical portion 10 of the casing 2.

(9)

In the hermetic compressor 1 of the embodiment, the proportion of the sum of the perimeters of the joining portions 7 on a cross section that is orthogonal to the central axis of the cylindrical portion 10 and includes the joining portions 7 to the perimeter of the inner peripheral surface of the cylindrical portion 10 is less than 10% with respect to the portion where the outer peripheral surface of the motor stator 8 and the inner peripheral surface of the cylindrical portion 10 face each other, and the clearance 13 is secured at other portions except the spot joining portions 7. For that reason, it becomes difficult for vibration of the motor stator 8 to spread to the casing 2, so it is possible to suppress vibration of the cylindrical portion 10 of the casing 2.

(10)

In the hermetic compressor 1 of the embodiment, the through holes 10a are disposed as welding holes in the cylindrical portion 10, so it is possible to fix the motor stator 8 by welding to the cylindrical portion 10 via the through holes 10a.

<Modifications>

(A)

In the preceding embodiment, the spot-like spot joining portions 7 resulting from spot welding or the like have been taken as an example and described as the joining portions, but the present invention is not limited to this, and the joining portions may also be linear joining portions or the like. In this case also, by ensuring that a joining area S2 that is the sum of the cross-sectional areas of the spot joining portions 7 is less than 10% with respect to an opposing area S1 of the portion where the outer peripheral surface of the motor stator 8 and the inner peripheral surface of the cylindrical portion 10 face each other and that the clearance 13 is secured at other portions except the spot joining portions 7, it becomes difficult for vibration of the motor stator 8 to spread to the casing 2, and it is possible to suppress vibration of the cylindrical portion 10 of the casing 2.

(B)

In the preceding embodiment, the spot joining portions 7 resulting from spot welding have been taken as an example and described as the joining portions, but the present invention is not limited to this; as a modification of the present invention, the spot joining portions 7 may also be convex portions that are formed on either the motor stator 8 or the cylindrical portion 10. In this case also, it becomes difficult for vibration of the motor stator 8 to spread to the casing 2, and it is possible to suppress vibration of the cylindrical portion 10 of the casing 2.

(C)

In the preceding embodiment, the spot joining portions 7 resulting from spot welding have been taken as an example and described as the joining portions, but the present invention is not limited to this; as another modification of the present invention, members that are fitted between the motor stator 8 and the cylindrical portion 10 may also be used as the spot joining portions 7.

For example, the spot joining portions 7 may include a spacer that is interposed between the motor stator 8 and the cylindrical portion 10 and laser-welded portions where the spacer has been respectively laser-welded to the motor stator 8 and the cylindrical portion 10. In this case also, it becomes difficult for vibration of the motor stator 8 to spread to the casing 2, and it is possible to suppress vibration of the cylindrical portion 10 of the casing 2.

(D)

In the preceding embodiment, the motor stator 8 was fixed to the cylindrical portion 10 by spot joining resulting from spot welding, but the present invention is not limited to this.

Figure 5:
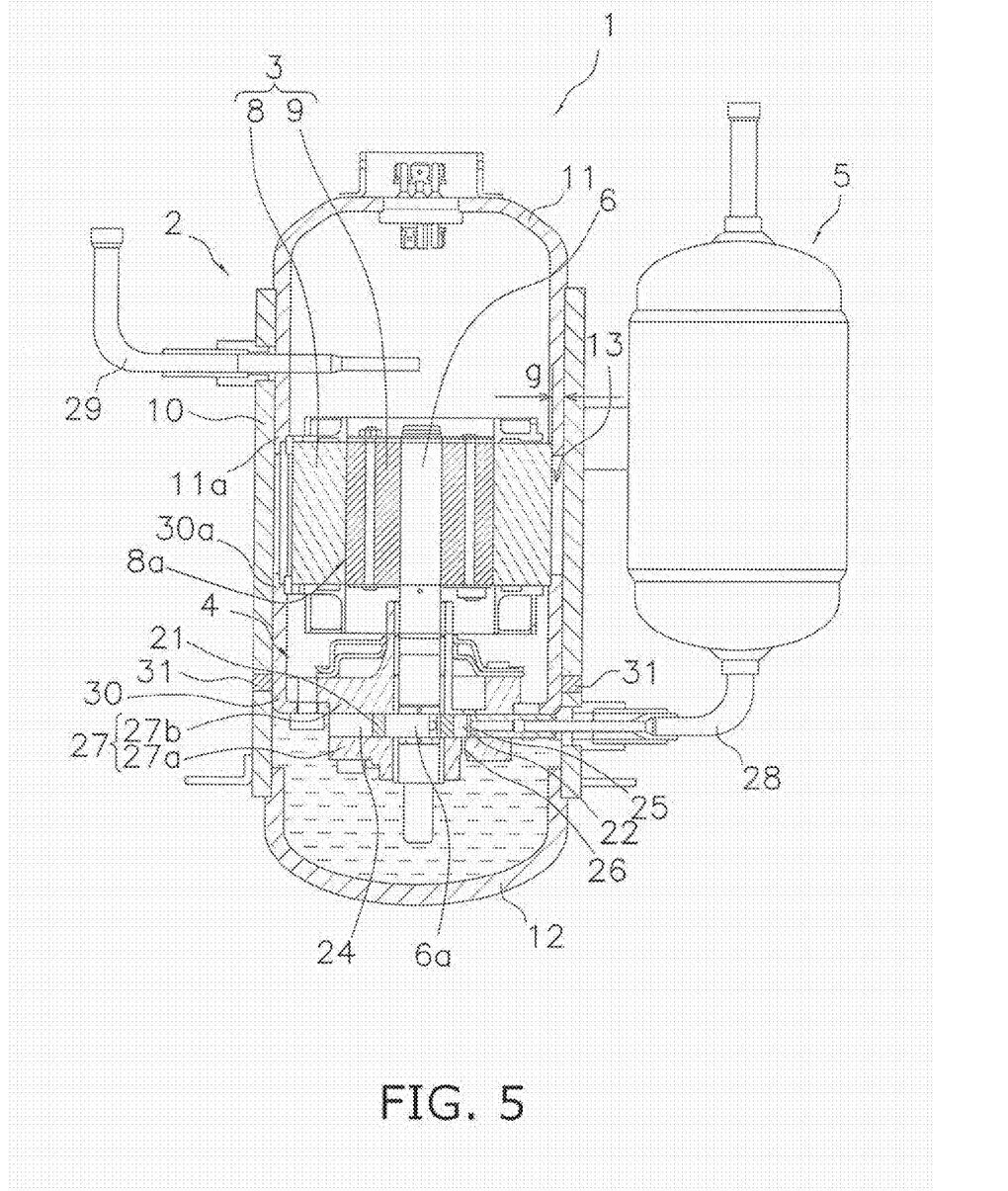
FIG. 5 is a longitudinal sectional diagram of a hermetic compressor pertaining to a modification of the present invention.

As a modification of the present invention, as shown in FIG. 5, the motor stator 8 may also be sandwiched between and held by configural members that are respectively positioned above and below the motor stator 8—for example, an extension of a lower end portion 11a of the end plate 11 and an extension of an upper end portion 30a of the mounting plate 30—such that the motor stator 8 is fixed in a state where the clearance 13 is disposed between the motor stator 8 and the cylindrical portion 10.

In this case also, by ensuring that the proportion of the sum of the perimeters of the joining portions 7 on a cross section that is orthogonal to the central axis of the cylindrical portion 10 and includes the joining portions 7 to the perimeter of the inner peripheral surface of the cylindrical portion 10 is less than 10% with respect to the portion where the outer peripheral surface of the motor stator 8 and the inner peripheral surface of the cylindrical portion 10 face each other and that the clearance 13 is secured at other portions except the spot joining portions 7, it becomes difficult for vibration of the motor stator 8 to spread to the casing 2, and it is possible to suppress vibration of the cylindrical portion 10 of the casing 2.

It will be noted that the motor stator 8 may be fixed by only being sandwiched between and held by the end plate II and the mounting plate 30, or, the motor stator 8 may be fixed by both of the fixing methods of being sandwiched between and held by the end plate 11 and the mounting plate 30 and of being spot-joined to the cylindrical portion 10 by the plural spot joining portions 7 (see FIG. 1).

(E)

Further, as a modification of the hermetic compressor of the present invention, the present invention can also be applied to a scroll-shaped or a reciprocal-shaped compressor. Further, the present invention can also be applied to a one-cylinder type or a two-cylinder type of rotary-shaped compressor.

INDUSTRIAL APPLICABILITY

The present invention is capable of being widely applied in regard to hermetic compressors where a motor stator is fixed inside a casing.

What is claimed is:

1. A hermetic compressor comprising:
   an annular motor stator;
   a motor rotor being disposed to rotate freely in a space inside the motor stator;
   a casing having a cylindrical portion to house the motor stator and the motor rotor;
   a compression mechanism housed inside the casing; and
   a plurality of spot joining portions fixing the motor stator to the cylindrical portion by spot joining in a state where a clearance is secured between the motor stator and the cylindrical portion,
   the spot joining portions being disposed in three or more spots in a circumferential direction on an outer peripheral surface of the motor stator, with the spot joining portions being formed by spot welding, and
   the cylindrical portion coming in contact with the motor stator only at spot welding parts of the spot joining portions, and the clearance is secured between the motor stator and the cylindrical portion by the spot welding parts.

2. The hermetic compressor according to claim 1, wherein a size of the clearance is 10 to 300 μm.

3. The hermetic compressor according to claim 2, wherein the spot joining portions are disposed in a plurality of places in an axial direction of the motor rotor on an outer peripheral surface of the motor stator.

4. The hermetic compressor according to claim 1, wherein the proportion of the sum of the perimeters of the joining portions on a cross section that is orthogonal to a central axis of the cylindrical portion and includes the spot joining portions to the perimeter of an inner peripheral surface of the cylindrical portion is less than 10% with respect to a portion where an outer peripheral surface of the motor stator and the inner peripheral surface of the cylindrical portion face each other, and a clearance is secured at other portions different from the spot joining portions.

5. The hermetic compressor according to claim 3, wherein welding holes are disposed in the cylindrical portion with respect to the motor stator, and the motor stator is welded to the cylindrical portion via the welding holes.

6. The hermetic compressor according to claim 1, wherein the spot joining portions are disposed in a plurality of places in an axial direction of the motor rotor on an outer peripheral surface of the motor stator.

7. The hermetic compressor according to claim 1, wherein welding holes are disposed in the cylindrical portion with respect to the motor stator, and the motor stator is welded to the cylindrical portion via the welding holes.

8. The hermetic compressor according to claim 1, further comprising
   a mounting plate being housed inside the casing, wherein the compression mechanism is fixed to the casing by spot welding between the mounting plate and the casing.

* * * * *